United States Patent
Huther et al.

(10) Patent No.: US 7,275,794 B2
(45) Date of Patent: Oct. 2, 2007

(54) BRAKING SYSTEM FOR A BATTERY POWERED INDUSTRIAL TRUCK

(75) Inventors: Sebastian Huther, Hamburg (DE); Frank Manken, Henstedt-Ulzburg (DE); Nis-Georg Nissen, Brokstedt (DE)

(73) Assignee: Jungheinrich Aktiengesellschaft, Hamburg (DE)

( * ) Notice: Subject to any disclaimer, the term of this patent is extended or adjusted under 35 U.S.C. 154(b) by 0 days.

(21) Appl. No.: 10/811,672

(22) Filed: Mar. 29, 2004

(65) Prior Publication Data

US 2004/0195911 A1  Oct. 7, 2004

(30) Foreign Application Priority Data

Apr. 4, 2003  (DE) .................. 103 15 297

(51) Int. Cl.
*B60T 13/74* (2006.01)
*B60T 8/60* (2006.01)

(52) U.S. Cl. ............. 303/3; 303/20; 303/155; 303/DIG. 2

(58) Field of Classification Search ............ 303/3, 303/5, 7, 15, 155, 162, 191, DIG. 1, DIG. 2
See application file for complete search history.

(56) References Cited

U.S. PATENT DOCUMENTS

| | | | | |
|---|---|---|---|---|
| 3,289,062 A * | 11/1966 | Dannettell | ........... | 318/139 |
| 3,868,150 A | 2/1975 | Maskery | ........... | 303/20 |
| 4,421,213 A * | 12/1983 | Brosius et al. | ........... | 188/296 |
| 5,117,163 A * | 5/1992 | Sandberg | ........... | 318/52 |
| 5,476,310 A | 12/1995 | Ohtsu et al. | ........... | 303/3 |
| 5,511,859 A | 4/1996 | Kade et al. | ........... | 303/3 |
| 6,122,585 A * | 9/2000 | Ono et al. | ........... | 701/71 |
| 6,208,926 B1 * | 3/2001 | Wagner et al. | ........... | 701/70 |
| 6,427,110 B1 * | 7/2002 | Manken et al. | ........... | 701/93 |
| 6,805,415 B2 * | 10/2004 | Isono et al. | ........... | 303/122.11 |
| 2003/0127289 A1 * | 7/2003 | Elgas et al. | ........... | 187/224 |

FOREIGN PATENT DOCUMENTS

| | | |
|---|---|---|
| DE | 196 29 386 | 9/1999 |
| EP | 0 758 591 | 2/1997 |
| EP | 0 908 348 | 4/1999 |
| EP | 0 814 051 | 12/2001 |
| GB | 2293364 A * | 3/1996 |
| JP | 4117105 A * | 4/1992 |

* cited by examiner

*Primary Examiner*—Melody M. Burch
(74) *Attorney, Agent, or Firm*—Vidas, Arrett, Steinkraus

(57) ABSTRACT

A braking system for battery-powered industrial trucks, comprising a three-phase driving motor which drives a driving wheel, a first braking device associated with the driving wheel, a brake pedal with which a braking signal generator is associated to generate an electric braking signal corresponding to a first desired braking force in response to the excursion of the brake pedal, a control device for the driving motor, a first conversion unit in the control device which converts said braking signal into a desired torque for the driving motor, a second conversion unit in the control device which converts the actual torque of the driving motor into an actual braking force, a comparator device in a braking control in which the first desired braking force is compared to the actual braking force to form a second desired braking force for the second braking device.

7 Claims, 1 Drawing Sheet

Figure 1:
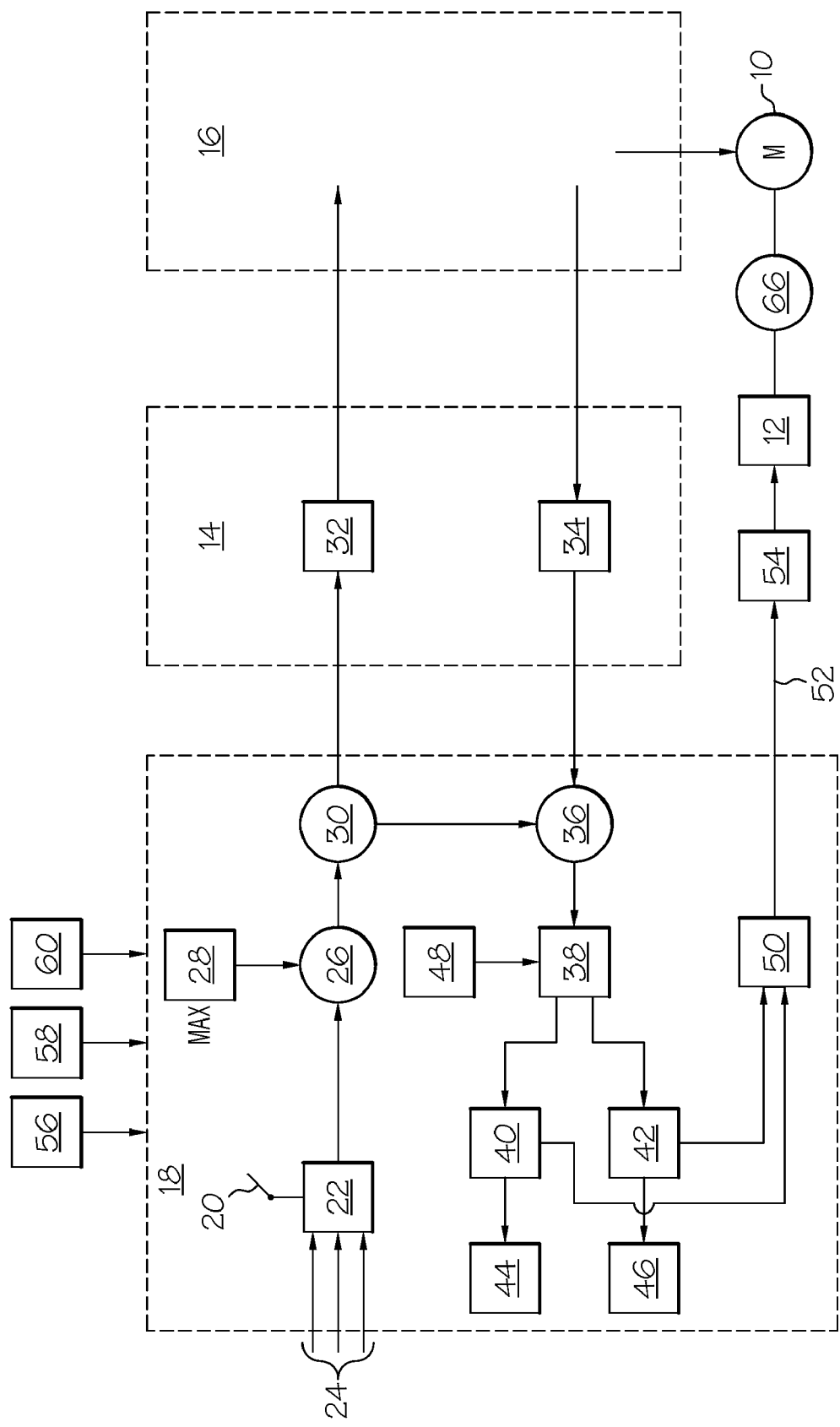

BRAKING SYSTEM FOR A BATTERY POWERED INDUSTRIAL TRUCK

CROSS-REFERENCE TO RELATED APPLICATIONS

Not applicable.

STATEMENT REGARDING FEDERALLY SPONSORED RESEARCH

Not applicable.

BACKGROUND OF THE INVENTION

Industrial trucks of this type mostly have a driving wheel driven by an electric motor and idling load-carrying wheels. It is known to associate brakes with both the driving wheel and load-carrying wheels. The brake for the driving wheel can also be associated directly with the driving motor. It is known to employ hydraulic drum brakes for the brakes described. It is also known to use single-disc spring force loaded magnetic brakes for the driving motors. Those are mostly designed as so-called "fail-safe" brakes because there is a prescription that if an electric steering, as is frequently used for such industrial trucks, fails the vehicle requires to be slowed down in a regular manner.

For industrial trucks provided with three-phase motors, it is also known to be slowed down by means of the driving motor that acts as a generator. The braking action produced by means of the generator may help in realizing a "coast-down brake" as is disclosed in DE 196 29 386 C1, for example. This state of the art also describes the use of target value ramps in dependence on the position of the brake pedal.

EP 0 908 348 has made known to use the help of the driving motor to achieve a load-independent braking behavior. An identical braking distance which is proportional to the excursion of the brake pedal is predetermined for a speed control of the driving motor. Speed target value ramps are predetermined which are chosen depending on the pedal position. Brakes of the load-carrying wheels which are also provided in the known case are connected from a certain pedal position onwards.

EP 0 814 051 B1 has made known to provide at least one brakable axle and at least one non-brakable axle for an industrial truck with a control unit generating a variable control signal setting the admissible maximum speed of the industrial truck. The control signal is varied by means of the control unit in dependence on the direction of travel of the industrial truck in such a way that a higher maximum speed is allowed during a travel in the direction of the brakable axle than is during a travel in the direction of the non-brakable axle.

EP 0 758 591 A1 has made known to generate an electric braking signal by means of a braking signal generator which is actuated by the brake signal. The brake signal is supplied to the motor control which predetermines the extent of energy recovery. What results therefrom is the extent of generative deceleration. Since the braking torque produced by the motor is frequently insufficient to ensure the desired deceleration a delay sensor is provided which measures the delay in deceleration and generates a signal for a braking system which produces a mechanical braking force in response to the deficiency of motor-induced deceleration in order that the braking behavior be attained.

It is the object of the invention to provide a braking system for an industrial truck by means of which a low-wear braking effect can be achieved. The object is attained by the features of claim 1. The braking behavior is intended to be approximated to that of a hydraulic brake.

BRIEF SUMMARY OF THE INVENTION

In the inventive braking system, a braking signal is produced by means of the brake pedal in a known manner. The braking signal is transformed into a desired braking force which is inputted to the control device of the driving motor. There, a first conversion unit converts the braking signal into a desired torque for the driving motor. Using the help of the travel control, the driving motor produces a braking torque, in dependence on its speed, which is naturally limited according to the speed torque characteristic of the driving motor. A second conversion unit helps in converting the really achievable actual torque of the driving motor into an actual braking force. The actual torque is compared to the first desired braking force to generate a second desired braking force which predetermines the braking force for the second braking device.

In the inventive braking system, the braking force to be provided by the driving motor is completed by each braking device on the load-carrying wheels. The braking device provided on the driving wheel or braking motor is merely used in certain cases, reference to which fact will be made later.

The inventive braking system has some advantages. The driving motor is utilized to an optimum whereas the brakes of the load-carrying wheels are only employed in case of need. Deceleration via the driving motor almost involves no wear. Thus, a braking action is achieved which is largely low in wear. The inventive braking system behaves like a hydraulic brake by the brake pedal producing a braking torque proportional to its setting. In contrast, the disadvantages of hydraulic brakes are avoided, namely the larger wear and the difficulty in identifying a fault when a braking line breaks.

In the inventive braking system, the brakes of the load-carrying wheels are electric brakes. Hence, an aspect of the invention provides that a third conversion unit is provided which transforms the second desired braking force into a braking current. A current regulator predetermines the second desired braking force for the second braking device in response to a current braking force characteristic. The characteristic can be linear, progressive or degressive, as required. It ensures that the overall braking behavior of the vehicle can be matched to the system behavior and/or the operator's desire.

As mentioned before, the driving wheel brake and the brake associated with the shaft of the motor only serves for certain applications. In an aspect of the invention, a provision is made for the brake control device to generate a hard stop signal for said first braking device when the braking signal of the braking signal generator becomes a maximum. In this case, the first braking device will be connected when a hard stop occurs. Alternatively, the first braking device can also be employed as a pure stop brake when the industrial truck has stopped or is at an uphill grade. In another aspect of the invention, the first braking device can also be controlled when a monitoring device emits an error signal. Thus, for example, a line rupture can be found to exist while the electric brake transmits signals. This also applies to the case where an industrial truck has an electric steering mechanism.

In this case, the regulation is that an immediate deceleration has to be carried out when the electric line is defective.

In an aspect of the invention, another provision is made for the hard stop signal to be provided to the first braking device via a time delay member. This can avoid an abrupt deceleration by means of the first braking device, which fact is adverse particularly under certain load conditions and for certain lifting heights because it will impair the safety of the industrial truck.

It is also imaginable to make the braking behavior of the inventive braking system dependent on certain vehicle or travel parameters, e.g. to provide a load sensor sensing the load imposed the signals of which are provided to the brake control device. Likewise, a travel direction sensor may be provided. For example, this prevents an deceleration from leading to an unstable condition of the vehicle while the industrial truck is moving through a curve or in an oblique travel. This same is true for an integration of the lifting height which can be measured by means of a lifting height sensor.

An embodiment of the invention will be described in more detail below with reference to a drawing.

BRIEF DESCRIPTION OF THE SEVERAL VIEW OF THE DRAWINGS

FIG. 1 shows a block diagram of the braking system according to the invention.

DETAILED DESCRIPTION OF THE INVENTION

While this invention may be embodied in many different forms, there are described in detail herein a specific preferred embodiment of the invention. This description is an exemplification of the principles of the invention and is not intended to limit the invention to the particular embodiment illustrated FIG. 1 shows a three-phase motor which drives a driving wheel, which is not shown, for an industrial truck. The driving wheel, which is not shown, has associated therewith a first braking device 12. The braking device 12 can also be associated with the shaft of the driving motor 10. A travel control, which is not explained in detail, for the battery-powered three-phase motor 10 is housed in the blocks 14, 16 shown in phantom lines. A braking control 18 is accommodated in the further block shown in phantom lines. A brake pedal 20 in the industrial truck, which is not shown, is actuated by the operator. A braking signal generator, which is actuated by the brake pedal 20, is housed in a block 22. The block 22 also houses a monitoring device reference to which will be made later. Individual function signals for the block are inputted via the arrows 24 which, however, is of no significance for the operation of the braking system described.

A signal which is proportional to a desired braking force is provided to a comparator device 26. This braking force is the one by which the vehicle is to be slowed down in response to the brake pedal position. A signal which is proportional to the maximum braking force is also inputted to the comparator device 26. This is accomplished via the block 28. The desired braking force is applied to a first conversion unit 32 in the travel control via a junction point 30, i.e. in the block 14. The conversion unit 32 calculates a torque for the driving motor 10 from the desired braking force. A second conversion unit 34 calculates an actual braking force from the actual torque of the motor 10.

The motor torque, which is adjusted via the predetermined braking force, is smaller than that required for the desired braking behavior, in many cases. In a second comparator device 36, the braking signal from generator 22 defining the desired braking force is compared with the actual braking force from the conversion unit 34. The remaining braking force is transformed into a braking current for a first and a second braking regulator 40 and 42 in a further conversion unit 38. The regulators 40, 42 may be P1 regulators. A braking force or braking torque is produced in load-carrying wheel brakes 44, 46 in response to the current of the regulators 40, 42. Parameters for the nominal braking force or the nominal braking current which are provided to the further conversion unit 38 are stored in a storage block 48.

The control apparatus of the first braking device on the driving wheel has a controller 50. It will be driven, for example, when a cable rupture or another fault is found to exist in the braking system. An appropriate monitoring device is housed in the block 22. The output of the controller 50 is designated 52. The regulators 40, 42 have also integrated therein monitoring devices which if an error message is issued provide a signal to the controller 50 for an emergency stop. The controller 50 always generates a hard stop signal for hard stop braking device 12; the hard stop signal is provided to the hard stop braking device 12 via a time delay member 54. A hard stop can also be made when other parameters measured cause a hard stop to be opportune. It is also imaginable here to connect the load-carrying wheel brakes 44, 46 for a hard stop. Lifting height sensor 56, load sensor 58 and travel direction sensor 60 are shown as inputs to brake control device 18. Finally, brake 12 has a drive wheel 66 associated with it.

The above disclosure is intended to be illustrative and not exhaustive. This description will suggest many variations and alternatives to one of ordinary skill in this art. All these alternatives and variations are intended to be included within the scope of the claims where the term "comprising" means "including, but not limited to". Those familiar with the art may recognize other equivalents to the specific embodiments described herein which equivalents are also intended to be encompassed by the claims.

Further, the particular features presented in the dependent claims can be combined with each other in other manners within the scope of the invention such that the invention should be recognized as also specifically directed to other embodiments having any other possible combination of the features of the dependent claims. For instance, for purposes of claim publication, any dependent claim which follows should be taken as alternatively written in a multiple dependent form from all prior claims which possess all antecedents referenced in such dependent claim if such multiple dependent format is an accepted format within the jurisdiction (e.g. each claim depending directly from claim 1 should be alternatively taken as depending from all previous claims). In jurisdictions where multiple dependent claim formats are restricted, the following dependent claims should each be also taken as alternatively written in each singly dependent claim format which creates a dependency from a prior antecedent-possessing claim other than the specific claim listed in such dependent claim below.

This completes the description of the preferred and alternate embodiments of the invention. Those skilled in the art may recognize other equivalents to the specific embodiment described herein which equivalents are intended to be encompassed by the claims attached hereto.

What is claimed is:

1. A braking system for battery-powered industrial trucks, the trucks having wheels, one of which is a driving wheel, the system comprising:
- a three-phase driving motor (10) which drives the driving wheel,
- a first braking device (12) associated with the driving wheel,
- a brake pedal (20) with which a braking signal generator (22) is associated to generate a first electric braking signal corresponding to a desired braking force value in response to the excursion of the brake pedal (20),
- a control device (14, 16) for the driving motor (10) through which the torque of the driving motor (10) is controlled,
- a first conversion unit (32) in the control device which converts the first braking signal into a desired torque value for the driving motor (10),
- a second conversion unit (34) in the control device which detects and converts an actual torque value of the driving motor (10) into an actual braking force value and generates an actual braking signal, the braking device being controlled by a braking control device (18) through a second braking signal, the braking control device (18) including a comparator device (36) wherein the first braking signal is compared with the actual braking signal to form the second braking signal for the braking device.

2. The braking system as claimed in claim 1, wherein a third conversion unit (38) is provided which transforms the actual braking signal into a braking current for a current controller (40,42) to generate the second braking signal for the first braking device (12) in response to a current braking force characteristic.

3. The braking system as claimed in claim 1, wherein the first braking device is a hard stop braking device and is associated with the driving wheel and the braking signal generator (22) generates a hard stop signal (50) for the hard braking device if the first braking signal becomes a maximum.

4. The braking system as claimed in claim 1, wherein the first braking device is a hard stop braking device and is associated with the driving wheel and the brake control device (18) generates a hard stop signal for the hard stop braking device if the braking signal generator receives an error signal.

5. The braking system as claimed in claim 3, wherein the hard stop signal is provided to the hard stop braking device (12) via a time delay member.

6. The braking system as claimed in claim 1, wherein the industrial truck has a travel direction sensor and/or a load sensor sensing the load imposed, the signals of which are inputted to the braking control device (18) which varies the second braking signal in dependence on the direction of travel and/or the load.

7. The braking system as claimed in claim 1, wherein the industrial trucks has a lifting height sensor, the signal of which is provided to the braking control device (18) which generates the second braking signal varying in dependence of the lifting height.

* * * * *